(12) United States Patent
Wang et al.

(10) Patent No.: US 9,876,419 B2
(45) Date of Patent: Jan. 23, 2018

(54) VIBRATION MOTOR

(71) Applicants: Hongxing Wang, Shenzhen (CN);
Lubin Mao, Shenzhen (CN)

(72) Inventors: Hongxing Wang, Shenzhen (CN);
Lubin Mao, Shenzhen (CN)

(73) Assignee: AAC TECHNOLOGIES PTE. LTD.,
Singapore (SG)

( * ) Notice: Subject to any disclaimer, the term of this patent is extended or adjusted under 35 U.S.C. 154(b) by 204 days.

(21) Appl. No.: 15/069,124

(22) Filed: Mar. 14, 2016

(65) Prior Publication Data
US 2017/0033658 A1 Feb. 2, 2017

(30) Foreign Application Priority Data

Jul. 31, 2015 (CN) ..................... 2015 2 0566827 U

(51) Int. Cl.
*H02K 33/00* (2006.01)
*H02K 33/16* (2006.01)
*H02K 1/34* (2006.01)

(52) U.S. Cl.
CPC ............... *H02K 33/16* (2013.01); *H02K 1/34* (2013.01)

(58) Field of Classification Search
CPC ......... H02K 33/16; H02K 33/18; H02K 33/00
USPC ........................................ 310/15, 25, 36, 81
See application file for complete search history.

(56) References Cited

U.S. PATENT DOCUMENTS

| 3,287,696 A * | 11/1966 | Cholet ................. G01V 1/145 181/121 |
| 8,427,016 B2 * | 4/2013 | So ........................ H02K 33/16 310/12.16 |
| 2015/0270765 A1* | 9/2015 | Yamamoto ............. H02K 35/02 310/25 |

* cited by examiner

*Primary Examiner* — Thanh Lam
(74) *Attorney, Agent, or Firm* — Na Xu; IPro, PLLC

(57) ABSTRACT

A vibration motor includes a fixed member, a vibration unit, and an elastic member. The fixed member includes a housing having a receiving space and a coil received in the receiving space and assembled with the housing. The vibration unit includes a first weight, a second weight, and a magnet sandwiched by the first and second weights. The motor further includes a positioning guiding member including a first weight guiding rail, a second weight guiding rail, a first base guiding rail formed on the bottom wall, a second base guiding rail formed on the bottom wall, a first movement rail formed by the first weight guiding rail and the first base guiding rail, a second movement rail formed by the second weight guiding rail and the second base guiding rail, and a plurality of rolling members accommodated in the first movement rail and the second movement rail.

8 Claims, 6 Drawing Sheets

VIBRATION MOTOR

FIELD OF THE DISCLOSURE

The present disclosure generally relates to vibration motors, and more particularly to a vibration motor used in a portable consumer electronic device.

BACKGROUND

With the development of the electronic technologies, portable consumer electronic devices are more popular and desired by people. A portable consumer electronic device, such as a wireless communication device, generally includes a vibration motor sued for generating tactile feedback.

Typically, flat linear vibration motors are commonly used. A flat linear vibration motor includes an elastic member, a vibration unit suspended by the elastic member, and a housing for accommodating the elastic member and the vibration unit therein. The elastic member is generally welded to the vibration unit. Due to the elastic member, the vibration unit moves not only along a horizontal direction, but also along a vertical direction. Normally, the vibration only along one direction is desired. Vibrations along two directions will accelerate the elastic fatigue of the elastic member, which will finally affect badly the performance of the vibration motor.

For this reason, it is necessary to provide a novel vibration motor to overcome the shortcomings above.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and exemplary embodiments thereof.

Embodiment 1

Figure 1:
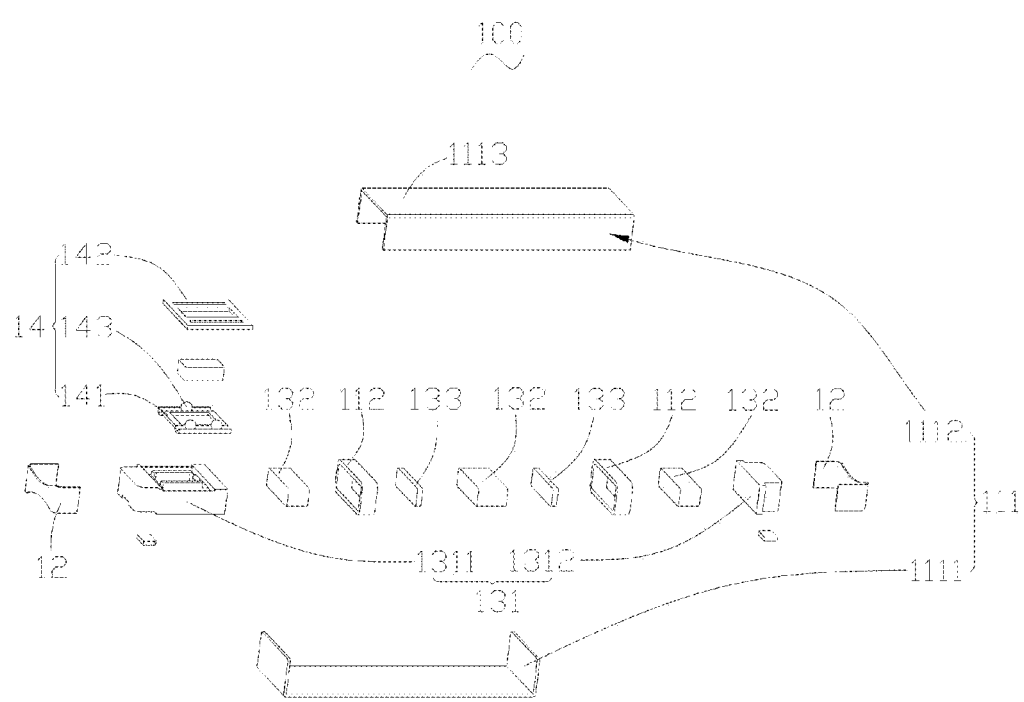
FIG. 1 is an isometric and exploded view of a vibration motor in accordance with a first exemplary embodiment of the present disclosure.
Figure 2:
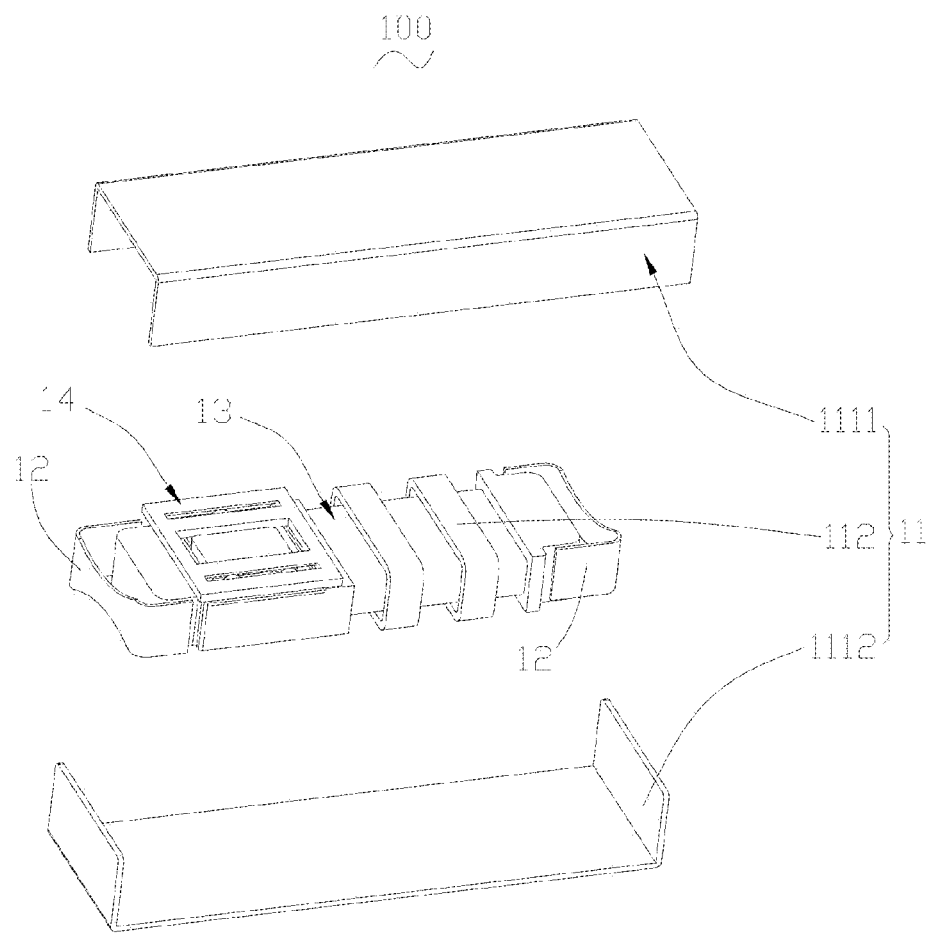
FIG. 2 is a partially exploded view of the vibration motor in FIG. 1.

Referring to FIGS. 1-2, a vibration motor in accordance with a first embodiment of the present disclosure includes a fixed member 11, a pair of elastic members 12, a vibration unit 13, and a positioning guiding member 14. The fixed member 11 includes a receiving space for accommodating the elastic members 12, the vibration unit 13 and the positioning guiding member 14. The elastic member 12 has an end connecting to the fixed member 11 and another end connecting the vibration unit 13 for suspending the vibration unit 12 in the receiving space.

The fixed member 11 includes a housing 111 and a coil 112 assembled with the housing 111. The housing 111 further comprises an upper cover 1111 and a base 1112 cooperatively forming the receiving space with the upper cover 1111. The base 1112 has a bottom wall 1113. A surface of the upper cover 1111 opposed to the bottom wall 1113 of the base is used for assembling the coil 112. The coil 112 defines a passage for letting the vibration unit go through. Another word, the coil 112 surrounds the vibration unit 12 and provides a space for the vibration unit to go through.

It is optional that the amount of the elastic members 12 is two, and the elastic members connect to two ends of the vibration unit 13. The vibration unit 13 includes a weight 131, a magnet 132 and a magnetic yoke 133. The weight 131 is arranged at two ends of the vibration unit 13. The magnet 132 includes several units attached with the magnetic yoke 133. The magnet 132 is sandwiched by the weight 131.

Figure 3:
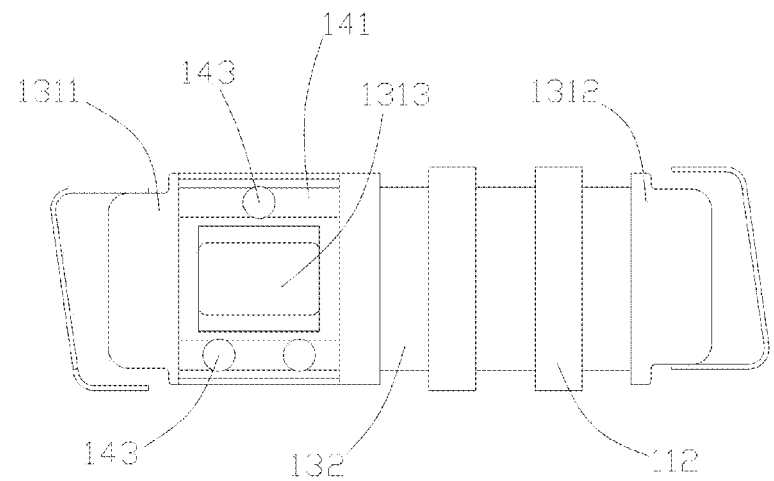
FIG. 3 is an assembled view of a vibration unit and a positioning guiding member of the vibration unit in FIG. 1.

Also referring to FIG. 3, the weight 131 includes a first weight 1311 and a second weight 1312. The first and second weights 1311, 1312 respectively serve as two ends of the vibration unit 13.

The positioning guiding member 14 includes a weight guiding rail 141, a base guiding rail 142 and a rolling member 143. The weight guiding rail 141 is embedded in the first weight 1311 and faces the bottom wall 1113. The base guiding rail 142 is arranged at the bottom wall 1113 and faces the weight guiding rail 141. The weight guiding rail 141 and the base guiding rail 142 cooperatively form a movement rail. The rolling members 143 are disposed in the movement rail. Optionally, the rolling members 143 could be balls or cylinders.

In this embodiment, the weight guiding rail 141 and the base guiding rail 142 form two parallel movement rails, a first movement rail and a second movement rail. The first movement rail engages with one rolling member 143, and the second movement rail engages with two rolling members 143.

The first weight further includes a magnetic body 1313 located between two movement rails. The bottom wall 1113 is made of magnetic conduction material. Thus, attractive force between the magnetic body 1313 and the bottom wall 1113 enables the constant contact between the weight guiding rail 141 or the base guiding rail 142 and the rolling members 143.

Embodiment 2

Figure 4:
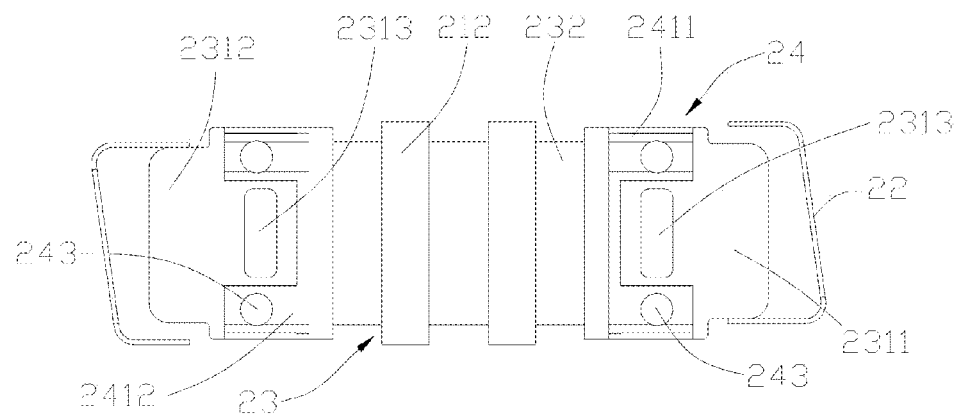
FIG. 4 is an assembled view of a vibration unit and a positioning guiding member of a vibration unit in accordance with a second exemplary embodiment of the present disclosure.

Referring to FIG. 4, a vibration motor in accordance with a second exemplary embodiment is disclosed. The vibration motor includes a first weight 2311 and a second weight 2312. Each of the first and second weights 2311, 2312 is embedded with a magnetic body 2313. Further, each of the first and second weights 2311, 2312 provides a weight guiding rail including a first weight guiding rail 2411 and a second weight guiding rail 2412. Correspondingly, the base guiding rail includes a first base guiding rail and a second base guiding rail. The first weight guiding rail 2411 and the first base guiding rail form two parallel movement rails. And the second weight guiding rail 2412 and the second base guiding rail form two parallel movement rails. The two rails formed by the first weight guiding rail 2411 and the first base guiding rail are symmetrical to each other about the magnetic body 2313 embedded in the first weight 2311. At the same time, the two rails formed by the second weight guiding rail 2412 and the second base guiding rail are symmetrical to each other about the magnetic body 2313 embedded in the second weight 2312. Each of the movement rails is engaged with a rolling member 243.

Embodiment 3

Figure 5:
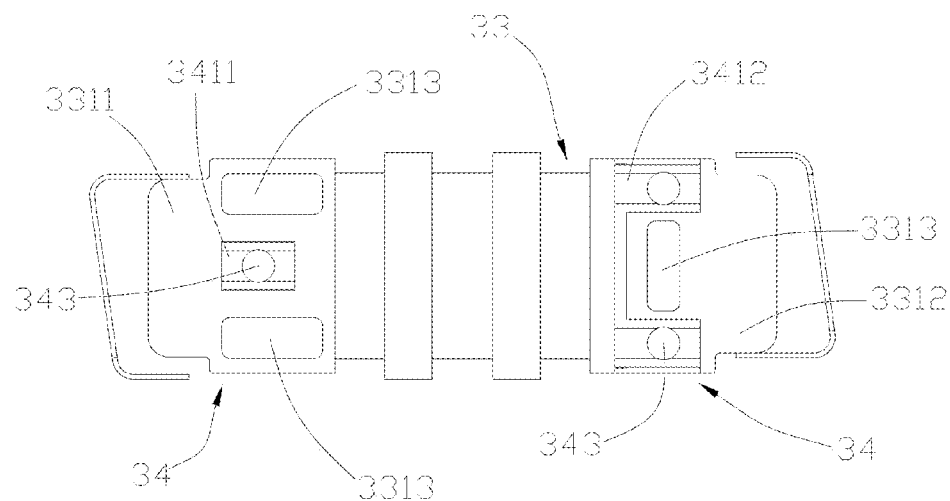
FIG. 5 is an assembled view of a vibration unit and a positioning guiding member of a vibration unit in accordance with a third exemplary embodiment of the present disclosure.

Referring to FIG. 5, a vibration motor in accordance with a third exemplary embodiment is disclosed. In this embodiment, the vibration unit 33 and the positioning guiding member 34 are different from the second exemplary embodiment. The first weight guiding rail 3411 and the first base guiding rail cooperatively form a movement rail engaging with a rolling member 343. The movement rail is located at a middle portion of the first weight 3311. Meanwhile, two magnetic bodies 3313 are disposed in the first weight 3311. Optionally, the two magnetic bodies 3313 are symmetrical to each other about the movement rail. By virtue of the configuration mention above, the attractive force between the vibration unit and the bottom wall of the housing.

Embodiment 4

Figure 6:
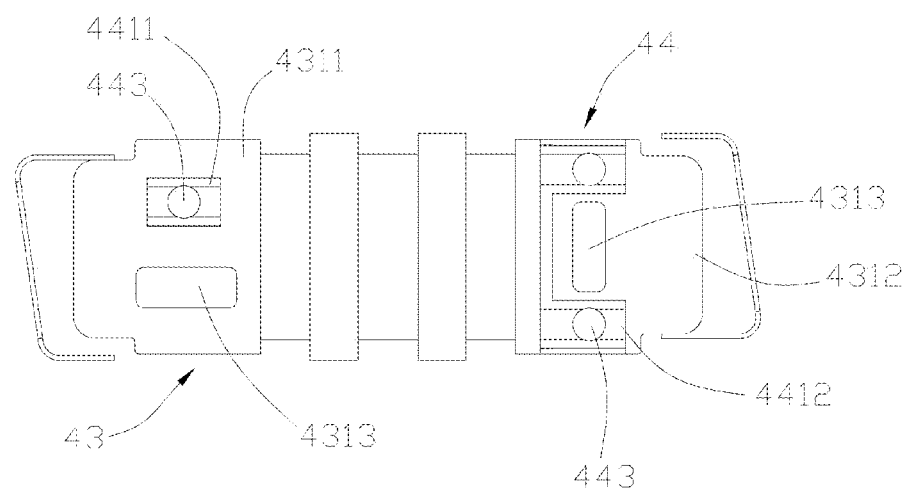
FIG. 6 is an assembled view of a vibration unit and a positioning guiding member of a vibration unit in accordance with a fourth exemplary embodiment of the present disclosure.
Figure 7:
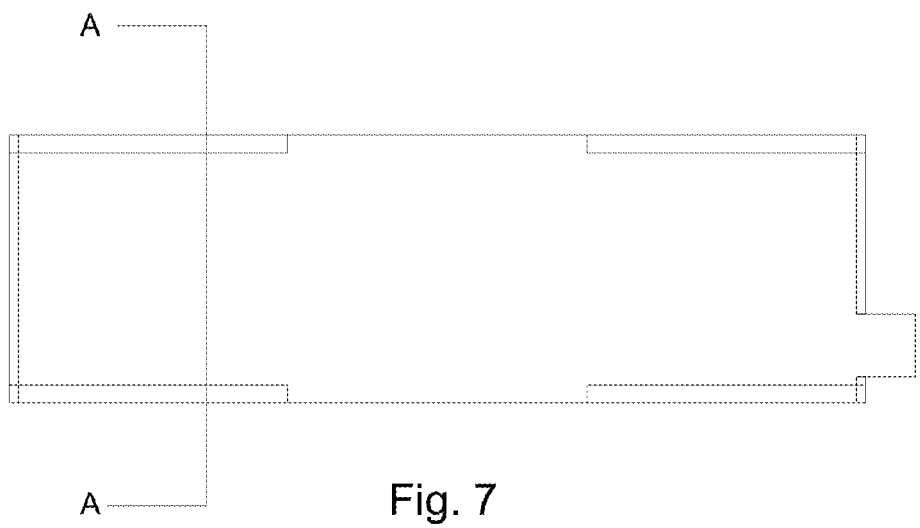
FIG. 7 is an illustration of a vibration motor in accordance with a fifth exemplary embodiment of the present disclosure.

Referring to FIG. 6, a vibration motor in accordance with a fourth embodiment is disclosed. The vibration motor in this embodiment is similar to the third embodiment, but the vibration unit 43 and the positioning guiding member 44 are different from embodiment 3. The first weight guiding rail 4411 and the first base guiding rail cooperatively form a movement rail which departs from the middle of the first weight 4311. The movement rail engages with a rolling member 443. A magnetic body 4313 is embedded in the first weight 4311.

Embodiment 5

Figure 8:
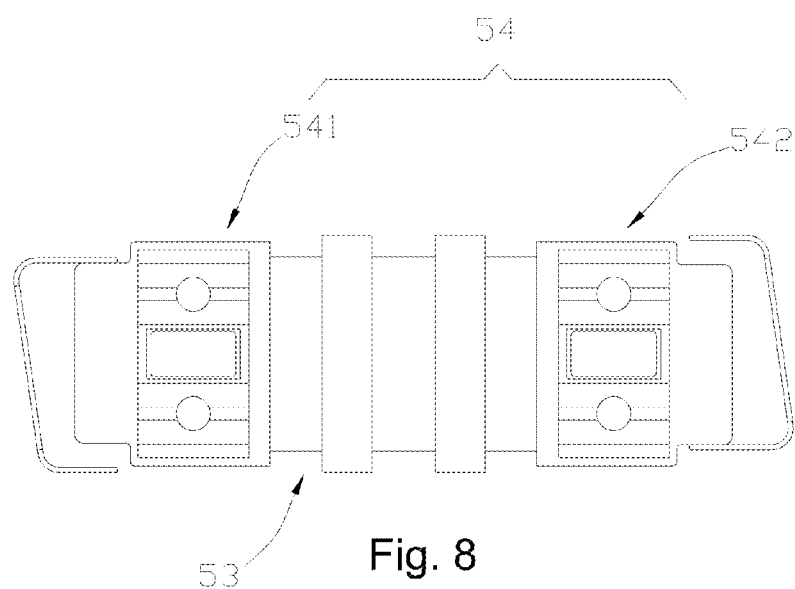
FIG. 8 an assembled view of a vibration unit and a positioning guiding member of the vibration unit in the fifth exemplary embodiment.
Figure 9:
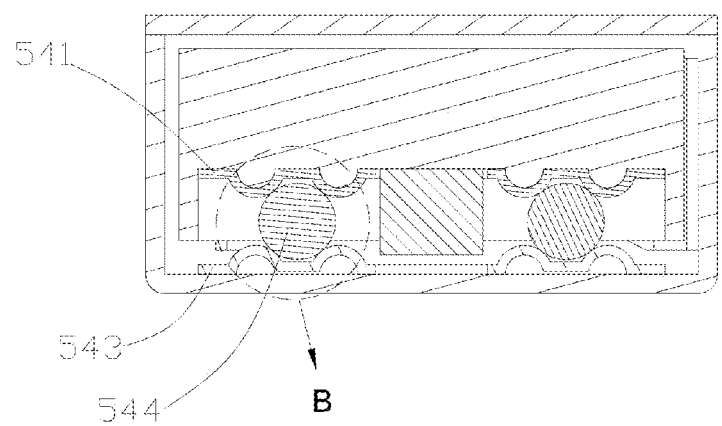
FIG. 9 is a cross-sectional view of Part A in FIG. 7 taken along line A-A.
Figure 10:
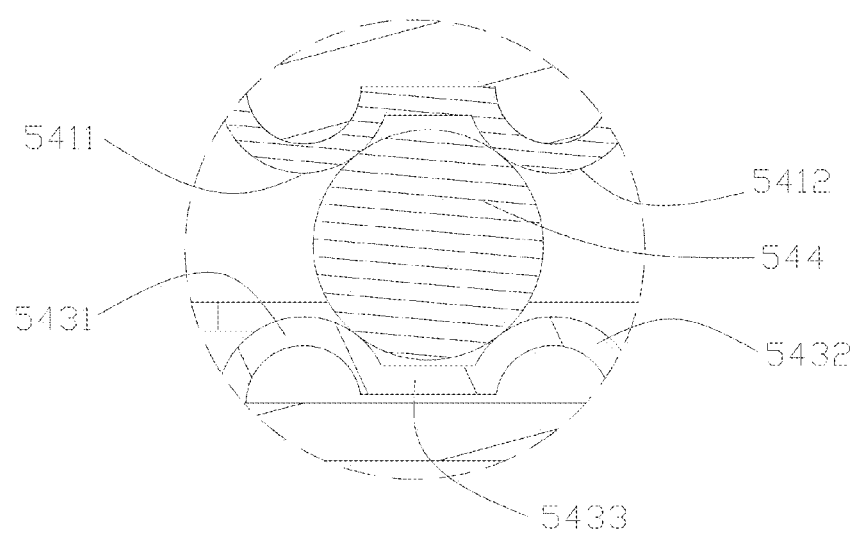
FIG. 10 is an enlarged view of Part B in FIG. 9.

Referring to FIGS. 8-10, a vibration motor in accordance with a fifth embodiment of the present disclosure is disclosed. The vibration motor includes a vibration unit 53 and a positioning guiding member 54. The weight guiding rail is directly formed on the weight by milling. The base guiding rail is formed by stamping. The weight guiding rail includes a first weight guiding rail 541 and a second weight guiding rail 542. In this embodiment, each of the first and second weight guiding rails 541 542, includes two parallel ribs. Taking the first weight guiding rail 541 as an example, the ribs of the first weight guiding rail include two ribs 5411, 5412. Correspondingly, the base guiding rail also includes two ribs corresponding to the first weight guiding rail and the second weight guiding rail, respectively. Taking the base guiding rail 543 corresponding to the first weight guiding rail 541 as an example, the ribs of the base guiding rail includes two ribs 5431, 5432. The ribs of the base guiding rail abut against the ribs of the weight guiding rail for forming the movement rail. The rolling members engage with the movement rail. In the embodiment, the base guiding rail 543 includes a main body connecting with the base, and the ribs 5431, 5432 extend from the main body toward the first weight 541. A part 5433 of the main body located between the ribs 5431, 5432 forms a gap between the part 5433 and the base.

Optionally, in all embodiments described above, the vibration unit may include positioning guiding members on surfaces facing the upper cover and the bottom wall of the base. Correspondingly, the upper cover can also include base guiding rails opposed to the weight.

Optionally, the vibration motor further includes buffing layer located between the base guiding rail and the bottom wall of the base. The buffing layer could buff the assault of the vibration unit.

Optionally, the bottom wall of the base could be provided with a magnetic body to interact with the magnetic body on the weight for enhancing the attractive force.

The vibration motor described above includes a positioning guiding part located between the vibration unit and the base for forming a movement rail, by which the vibration of the vibration unit is restricted in one direction.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vibration motor, comprising:
   a fixed member including a housing having a receiving space and a coil received in the receiving space and assembled with the housing, the housing including an upper cover and a base having a bottom wall opposed to the upper cover;
   a vibration unit including a first weight, a second weight, and a magnet sandwiched by the first and second weights;
   an elastic member having one end connecting to the housing and another end connecting to the vibration unit for suspending the vibration unit in the receiving space;
   a positioning guiding member including a first weight guiding rail formed on the first weight, a second weight guiding rail formed on the second weight, a first base guiding rail formed on the bottom wall and corresponding to the first weight guiding rail, a second base guiding rail formed on the bottom wall and corresponding to the second weight guiding rail, a first movement rail cooperatively formed by the first weight guiding rail and the first base guiding rail, a second movement rail cooperatively formed by the second weight guiding rail and the second base guiding rail, and a plurality of rolling members accommodated in the first movement rail and the second movement rail.

2. The vibration motor as described in claim 1, wherein each of the first weight and the second weight includes a magnetic body facing the bottom wall of the base, and the bottom wall is made of magnetic conduction material for generating attractive force for providing constant contact between the rolling members and the movement rails.

3. The vibration motor as described in claim 2, wherein the first weight guiding rail and the first base guiding rail form two parallel first movement rails disposed at two sides of the magnetic body in the first weight, and the second weight guiding rail and the second base guiding rail form two parallel two movement rails disposed at two sides of the magnetic body in the second weight.

4. The vibration motor as described in claim 2, wherein the bottom wall also includes magnetic bodies corresponding to the magnetic bodies in the first and second weights.

5. The vibration motor as described in claim 1, wherein the first weight guiding rail and the second weight guiding rail are also provided on the first and second weights facing the upper cover, and correspondingly, the first base guiding rail and the second base guiding rail are also provided on the upper cover.

6. The vibration motor as described in claim 5, wherein each of the first weight and the second weight includes a magnetic body facing the upper cover, and the upper cover is made of magnetic conduction material for generating attractive force for providing constant contact between the rolling members and the movement rails.

7. The vibration motor as described in claim 6, wherein the upper cover also includes magnetic bodies corresponding to the magnetic bodies in the first and second weights.

8. The vibration motor as described in claim 1 further including a buffing layer located between the first and second base guiding rails and the base.

\* \* \* \* \*